United States Patent
Maier et al.

(10) Patent No.: US 9,366,268 B2
(45) Date of Patent: Jun. 14, 2016

(54) SUB-FRAME INTEGRATION OF MOTOR-COMPRESSOR SYSTEMS

(71) Applicants: William C. Maier, Almond, NY (US); Jose L. Gilarranz, Katy, TX (US)

(72) Inventors: William C. Maier, Almond, NY (US); Jose L. Gilarranz, Katy, TX (US)

(73) Assignee: Dresser-Rand Company, Olean, NY (US)

( * ) Notice: Subject to any disclaimer, the term of this patent is extended or adjusted under 35 U.S.C. 154(b) by 315 days.

(21) Appl. No.: 13/628,154

(22) Filed: Sep. 27, 2012

(65) Prior Publication Data
US 2013/0078118 A1    Mar. 28, 2013

Related U.S. Application Data

(60) Provisional application No. 61/539,584, filed on Sep. 27, 2011.

(51) Int. Cl.
| | |
|---|---|
| *F04D 25/06* | (2006.01) |
| *F04D 29/60* | (2006.01) |
| *F04D 29/62* | (2006.01) |
| *F01C 21/00* | (2006.01) |
| *F04B 39/00* | (2006.01) |
| *F04B 39/12* | (2006.01) |
| *F04C 18/16* | (2006.01) |
| *F16M 1/04* | (2006.01) |

(52) U.S. Cl.
CPC ............ *F04D 29/601* (2013.01); *F01C 21/007* (2013.01); *F04B 39/0044* (2013.01); *F04B 39/12* (2013.01); *F04B 39/121* (2013.01); *F04D 25/06* (2013.01); *F04D 29/624* (2013.01); *F04C 18/16* (2013.01); *F16M 1/04* (2013.01)

(58) Field of Classification Search
CPC ..... F04D 29/60; F04D 29/601; F04D 29/603; F04D 29/624; F04D 25/06; F04B 17/03; F04B 41/00; F04B 17/00; F04B 39/04; F04B 39/06; F04B 35/04; F04B 39/0044; F04B 39/121; F04B 39/12; B01D 36/00; F04C 29/02; F04C 18/00; F04C 29/624; F04C 18/16; F01C 21/007; F16M 1/04
USPC ........... 417/313, 359, 360, 363, 410.1, 423.1, 417/321; 464/172; 248/214, 227.4, 229.2, 248/229.25, 674, 675, 676, 678, 689, 670, 248/639, 346.03; 411/107, 116, 969, 971
See application file for complete search history.

(56) References Cited

U.S. PATENT DOCUMENTS

| | | | | |
|---|---|---|---|---|
| 6,089,031 | A * | 7/2000 | Stegner et al. | 62/77 |
| 7,186,095 | B2 * | 3/2007 | Skinner | F04B 39/12 248/677 |
| 2007/0227969 | A1 * | 10/2007 | Dehaene et al. | 210/603 |
| 2009/0205360 | A1 * | 8/2009 | Haley et al. | 62/498 |
| 2009/0324391 | A1 * | 12/2009 | Maier | B01D 45/12 415/121.2 |
| 2010/0074768 | A1 * | 3/2010 | Maier | 417/360 |
| 2010/0090087 | A1 * | 4/2010 | Maier | F01C 21/007 248/669 |

* cited by examiner

*Primary Examiner* — Devon Kramer
*Assistant Examiner* — Jon Hoffmann

(57) ABSTRACT

Apparatus and methods for supporting a compression system are provided. The apparatus includes a compressor support coupled to a compressor, and a motor support coupled to a motor, the motor and the compressor being stand-alone units and having a shaft extending therebetween. The apparatus also includes a subframe connector coupled to the compressor support and the motor support and configured to prevent radial and axial misalignment of the shaft.

19 Claims, 4 Drawing Sheets

SUB-FRAME INTEGRATION OF MOTOR-COMPRESSOR SYSTEMS

The present application claims priority to U.S. Application No. 61/539,584 filed Sep. 27, 2011. The priority application is hereby incorporated by reference in its entirety into the present application.

BACKGROUND

Traditional motor-driven compressor systems rely on a structural baseplate to locate and align the various components, including motors, compressors, gear boxes, etc. However, in some applications, for example, on off-shore oil platforms, space is at a premium; therefore, it is desirable to reduce the footprint of the compressor systems to the extent possible, without unacceptable sacrifices in efficiency, capacity, maintainability, or the like. As such, removal of supportive structural components would be desirable, so long as adequate rigidity and positional alignment of the various components could be maintained. As the baseplate typically provides this rigidity, it has generally not been considered an element that could be omitted from the system.

On the other hand, one way that the footprint of traditional systems has been reduced is by providing a motor that is configured to directly drive the compressor. This eliminates a need for a gear box, allowing a reduction in footprint size. Furthermore, some systems employ magnetic bearings, which eliminate the cost and complexity of traditional oil lubrication systems. Finally, some successful recent designs include an integrated, seal-less design where the motor and the compressor are housed in a single pressure containment vessel. The DATUM® C compressor, commercially-available from Dresser-Rand Company, Olean, N.Y., USA, is one example of such an integrated, seal-less compression system.

Although compact and suitable for a variety of applications, integrated compression system designs generally require significant specialization and customization at least of the motor, as the motor is required to interface with the compressor casing while maintaining a pressure barrier. Further, since the motor operates in the high-pressure environment of the compressor, motor efficiency drops can be experienced in comparison to atmospheric operation of the motor.

What is needed, then, is a compression system that has a reduced footprint, but obviates the above-described drawbacks experienced in integrated motor-compressor systems.

SUMMARY

Embodiments of the disclosure may provide an exemplary compression system. The compression system includes a compressor having a compressor support configured to support the compressor, and a stand-alone motor having a shaft coupled with the compressor to transfer energy thereto and a motor support configured to support the motor. The compression system also includes a subframe connector rigidly coupled to the motor and to the compressor. The subframe connector is configured to maintain axial and radial alignment of the shaft between the compressor and the motor.

Embodiments of the disclosure may also provide an exemplary apparatus for supporting a compression system. The apparatus includes a compressor support coupled to a compressor, and a motor support coupled to a motor, the motor and the compressor being stand-alone units and having a shaft extending therebetween. The apparatus also includes a subframe connector coupled to the compressor support and the motor support and configured to prevent radial and axial misalignment of the shaft.

Embodiments of the disclosure may further provide an exemplary method for supporting a compression system without a baseplate. The method includes flexibly supporting a compressor with a compressor support. The method also includes rigidly supporting a motor with a motor support, the motor including a shaft coupled with the compressor to drive the compressor, the motor and the compressor being stand-alone units. The method further includes rigidly connecting the compressor to the motor with a subframe connector.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
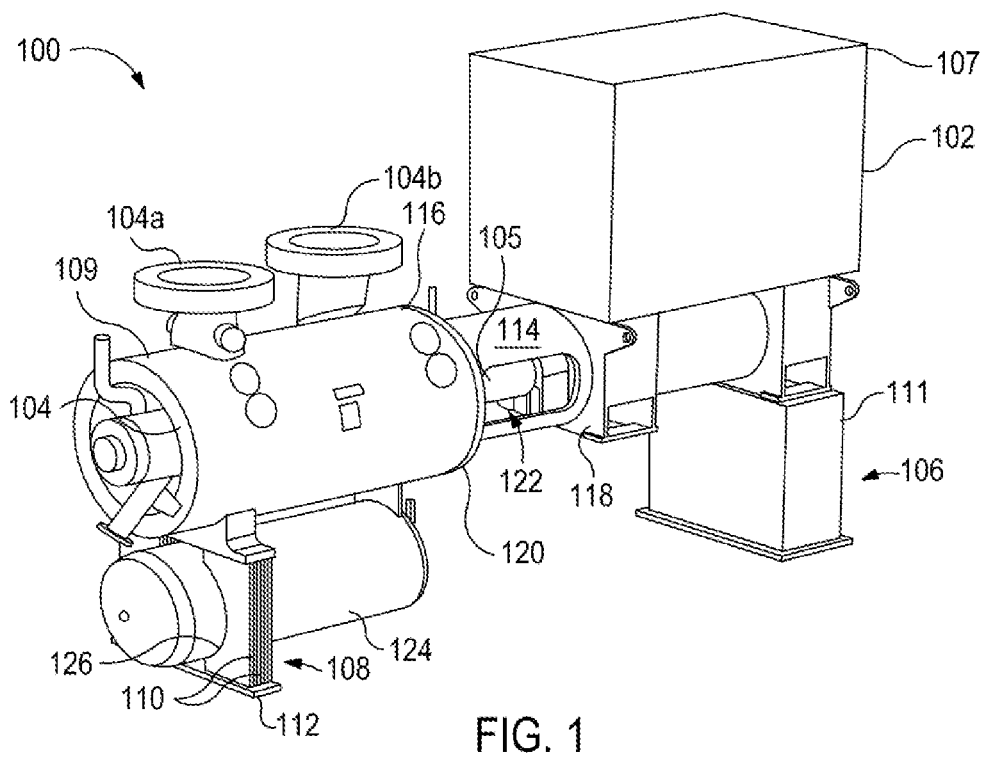
FIG. 1 illustrates a raised perspective view of an exemplary compression system, according to an embodiment.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
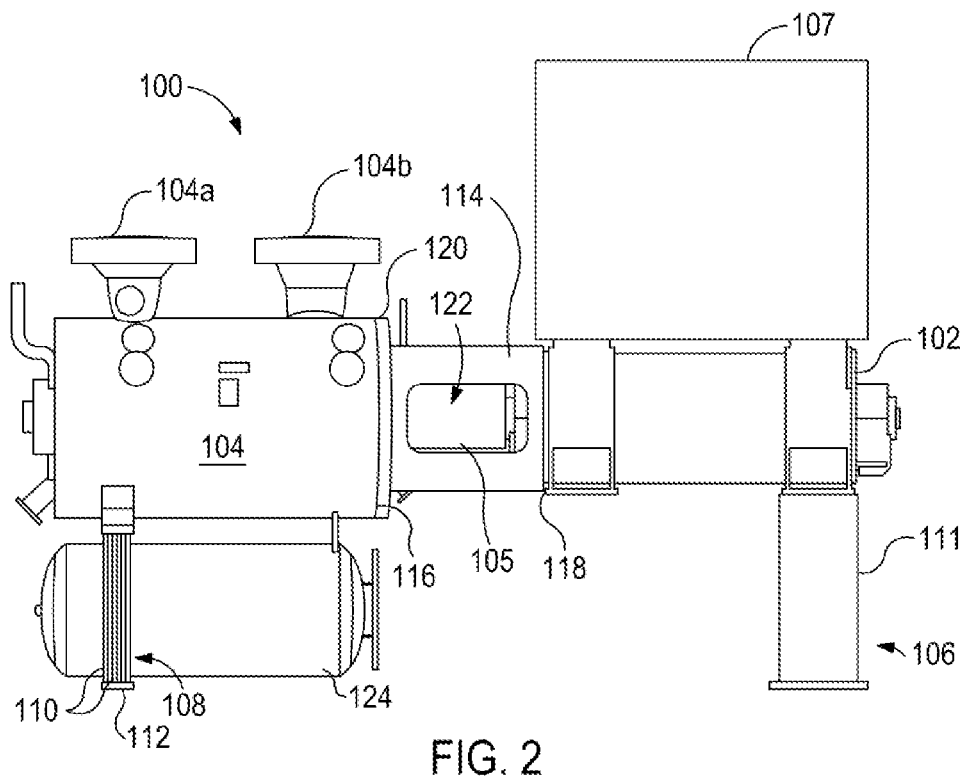
FIG. 2 illustrates an elevation view of the exemplary compression system of FIG. 1.

FIGS. 1 and 2 illustrate a raised perspective view and an elevation view, respectively, of an exemplary compression system 100, according to an embodiment described. The compression system 100 includes a motor 102 and a compressor 104. The motor 102 may be any suitable electric driver, internal combustion or diesel engine, gas or steam turbine, or the like. The compressor 104 may be any suitable type or configuration of compressor, such as a single or multistage centrifugal compressor, a screw compressor, an axial compressor, a reciprocating compressor, or the like. The DATUM® family of compressors, commercially-available from Dresser-Rand Company, Olean, N.Y., USA provides an example of one type of compressor 104 that may be suitable for use with the exemplary compression system 100.

As shown, the motor 102 and the compressor 104 are stand-alone units. As such, the motor 102 and the compressor 104 each include separate casings 107, 109. A shaft 105 extends between the motor 102 and the compressor 104 and may breach both of the casings 107, 109. Via the shaft 105, the motor 102 transfers energy and thereby drives the compressor 104. The driven compressor 104 thus receives a process gas via a suction inlet 104a, pressurizes the process gas, and discharges the process gas via a discharge outlet 104b for transportation via pipes or other conduits (not shown) downstream. In some exemplary embodiments, the process gas may be natural gas, other hydrocarbons, carbon dioxide, air, or the like.

The compression system 100 also includes a motor support 106 disposed below the motor 102 and configured to bear at least a portion of the weight of the motor 102. The motor support 106 may be or include a generally rigid pedestal 111 that is fixed (e.g., fastened or welded) to the motor 102 (e.g., to the motor casing 107) to prevent relative motion therebetween. Likewise, a compressor support 108 is disposed below and configured to bear at least a portion of the weight of the compressor 104. The compressor support 108 may be at least partially provided by a plurality of flex-plates 110 coupled to a foot 112. The flex-plates 110 are aligned, generally parallel, and offset from one another. The flex-plates 110 are rigid in a vertical direction, allowing the flex-plates 110 to bear weight, but are axially flexible, such that the flex-plates 110 facilitate a compliant mounting of the compressor 104. Such compliant mounting may allow the compressor 104 to translate over distances within a tolerance, to account for vibration in the compressor 104.

The compression system 100 also includes a subframe connector, which, as shown, may be provided by a generally cylindrical sleeve 114. The sleeve 114 may be coupled to an axial end 116 of the compressor 104 and may be disposed or otherwise extend at least partially around the shaft 105. The sleeve 114 may extend substantially parallel to the shaft 105 and may be coupled to an axial end 118 of the motor 102. The sleeve 114 may be fastened via a flange 120 and bolts (not shown) to the axial end 116 of the compressor 104 and welded, brazed, or integrally-formed with the axial end 118 of the motor 102. In various exemplary embodiments, either or both ends of the sleeve 114 may be coupled to the axial ends 116, 118 of the compressor 104 and motor 102, respectively, via fasteners, flanges, shear ring couplers, or other disconnectable couplings. Further, either or both ends of the sleeve 114 may be coupled to the axial ends 116, 118 via fixed couplings, such as by welding, brazing, adhering, riveting, or the like, or may be integrally formed therewith, without departing from the scope of the term "coupled" as it is used herein.

The sleeve 114 is constructed of a suitably-rigid material, such as steel, with a thickness dictated at least in part by the axial and radial displacement forces characteristic of the particular compression system 100, so as to fix the motor 102 and the compressor 104 together. Accordingly, the sleeve 114 may prevent axial and/or radial misalignment of the shaft 105, thereby preventing bottoming the shaft 105 against the stationary components of the compressor 104 and/or motor 102 during operation. Further, as the motor 102 and compressor 104 are stand-alone units, the sleeve 114 may not be required to contain a pressurized gas therein. Accordingly, the sleeve 114 may include one or more access regions 122 therein, which expose the shaft 105. Such access regions 122 may allow the shaft 105 to be maintained and any bearings, fittings, gear boxes, or the like disposed between the motor 102 and the compressor 104 to be maintained and/or replaced.

In an exemplary embodiment, the compression system 100 includes a fluid separator, which is not shown. The fluid separator may be disposed upstream of the compressor 104 and may be positioned within the compressor casing 109. Further, the fluid separator may be rotatable on the shaft 105 along with the internal rotary components of the compressor 104. In other embodiments, the fluid separator may be a static separator, such as a swirl tube or separating turn, or the fluid separator may be a combination of a static separator and a rotary separator. Such separators are known in the art and further non-limiting details may be found in commonly-assigned U.S. Pat. Nos. 7,241,392 and 7,288,202; and U.S. Patent Applications having Publication Nos. 2011/0061536; 2010/0072121; and 2010/0038309. The entirety of these disclosures is incorporated herein by reference to the extent they are consistent with the present disclosure.

One or more gas-break vessels 124 may be fluidly coupled to the fluid separators and configured to assist in the drainage of separated fluid therefrom. The structural and functional details of gas-break vessels in general are known and will not be described herein. Further, the gas-break vessel 124 may be disposed below the compressor 104 and may be coupled to the compressor support 108. In an exemplary embodiment, the gas-break vessel 124 may be disposed through holes 126 defined in each of the plurality of flex-plates 110. The holes 126 may be axially-aligned, so as to receive the gas-break vessel 124 therethrough. Further, the gas-break vessel 124 may be fixed in position relative to the compressor support 108 via grooves (not shown) receiving the flex-plates 110, or otherwise via welding, adhesives, resistance or interference fits, fasteners, or the like.

In operation, the sleeve 114, providing the subframe connector, the compressor support 108, and the motor support 106 cooperate to act as would a monolithic support structure, providing rigidity, stiffness, and rotor alignment for the compression system 100. More particularly, the compressor support 108 and the motor support 106 are coupled together via the compressor 104, the sleeve 114, and the motor 102 to provide a stable bipedal support structure for the compression system 100. Further, the sleeve 114, the compressor support 108, and the motor support 106 can rest on the ground, an oil platform, or the like and support the weight and fix the position of the compression system 100 thereon. Vibration in the compressor 104 may be absorbed by the flex-plates 110 of the compressor support 108, while the motor 102 is rigidly supported by the rigid pedestal 111 of the motor support 106. As such, the compression system 100 obviates a need for a baseplate, thereby reducing the required footprint. Although not shown, in some exemplary embodiments, the compressor support 108 may be rigid, while the motor support 106 may be flexible, without departing from the scope of the present disclosure.

Figure 3:
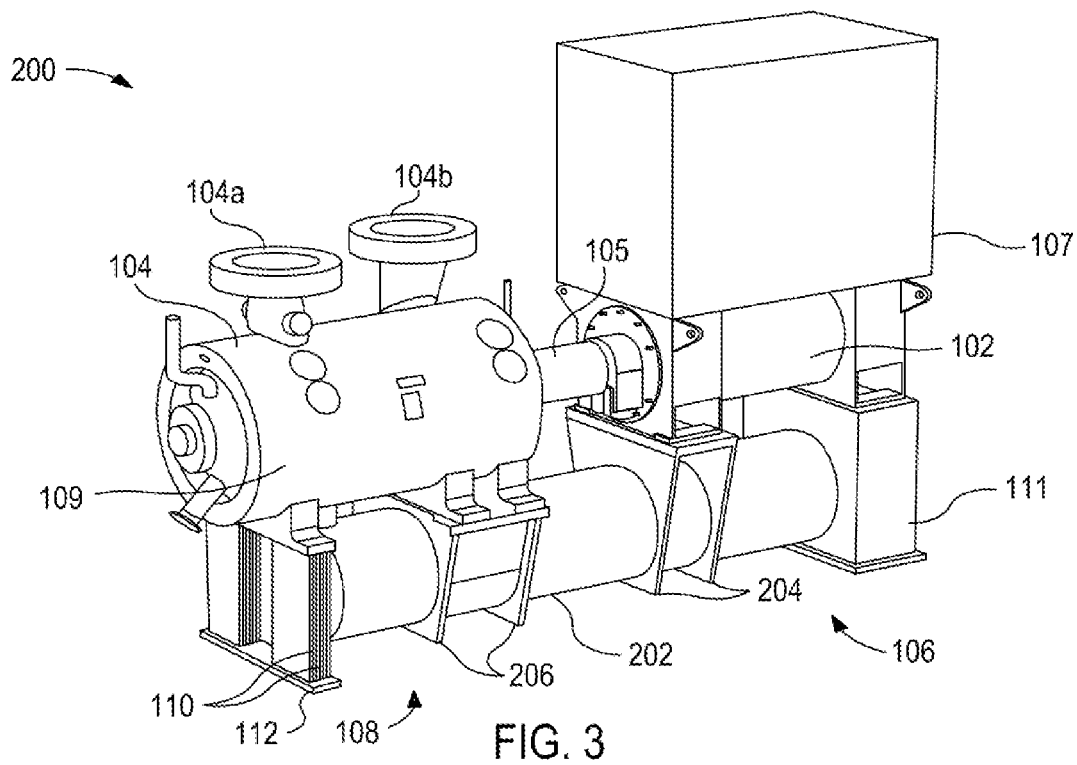
FIG. 3 illustrates a raised perspective view of another exemplary compression system, according to an embodiment.
Figure 4:
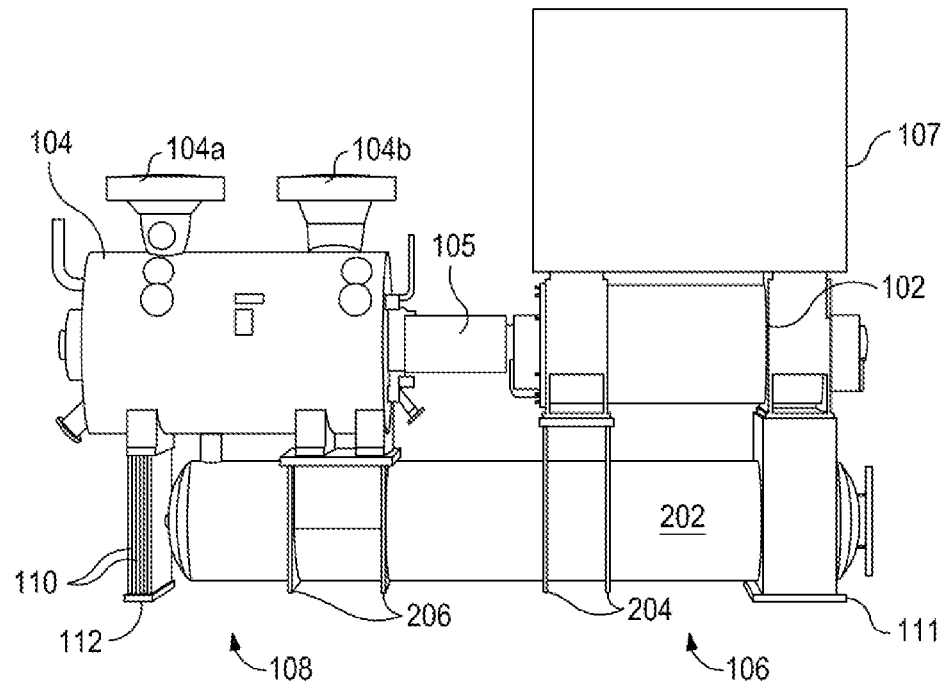
FIG. 4 illustrates an elevation view of the compression system of FIG. 3.

FIGS. 3 and 4 illustrate a raised perspective view and an elevation view, respectively, of another exemplary compression system 200, according to an embodiment described. The compression system 200 may be similar in structure and function to the compression system 100 described above with reference to FIGS. 1 and 2; accordingly, like elements are given like numbers in the Figures and will not be described in duplicate.

As shown, the compression system 200 includes an elongated gas-break vessel 202, providing the subframe connector and extending below the compressor 104 and the motor 102. The elongated gas-break vessel 202 is fluidly coupled to a separator, as described above for the gas-break vessel 124. Further, the compressor support 108 includes not only the flex-plates 110 and foot 112, but also a secondary, rigid support 206. Similarly, the motor support 106 includes the rigid pedestal 111 and also a secondary, rigid support 204.

The elongated gas-break vessel 202 extends from a point adjacent the flex-plates 110, through the rigid support 206, between the compressor 104 and the motor 102, through the rigid support 204 and couples with the rigid pedestal 111. For example, the elongated gas-break vessel 202 may be received through the rigid supports 206, 204 and into the rigid pedestal 111 and coupled thereto. The elongated gas-break vessel 202 may be coupled to any or all of the rigid supports 204, 206, and rigid pedestal 111, via grooves, interference or resistance fits, fasteners, adhesives, or the like. Further, the elongated gas-break vessel 202 includes a rigid shell. As such, the rigid supports 204, 206, and rigid pedestal 111 may be prevented from translating axially or vertically with respect to the elongated gas-break vessel 202, and thus also with respect to each other.

In operation, the rigid shell of the elongated gas-break vessel 202 provides rigidity to support and fix the position of the motor 102 and compressor 104, obviating the need for a baseplate. Moreover, as shown, both the motor support 106 and the compressor support 108 are bipedal (or may have more than two supports, as needed), as shown, such that each is generally able to stand on its own. The elongated gas-break vessel 202, however, provides a rigid coupling between the motor support 106 and at least a portion of the compressor support 108. As such, the shaft 105 is prevented from becoming misaligned radially or axially in either of the motor 102 or compressor 104 by relative movement between the two. Accordingly, the elongated gas-break vessel 202 provides a subframe connector. As such, the sleeve 114 of the compression system 100 may be omitted from the compression system 200, as shown, but in other embodiments may be provided for increased rigidity. Further, the elongated gas-break vessel 202 may generally not couple with the flex-plates 110, thereby ensuring the flexible support portion of the compressor support 108 remains able to handle vibration from the compressor 104.

Figure 5:
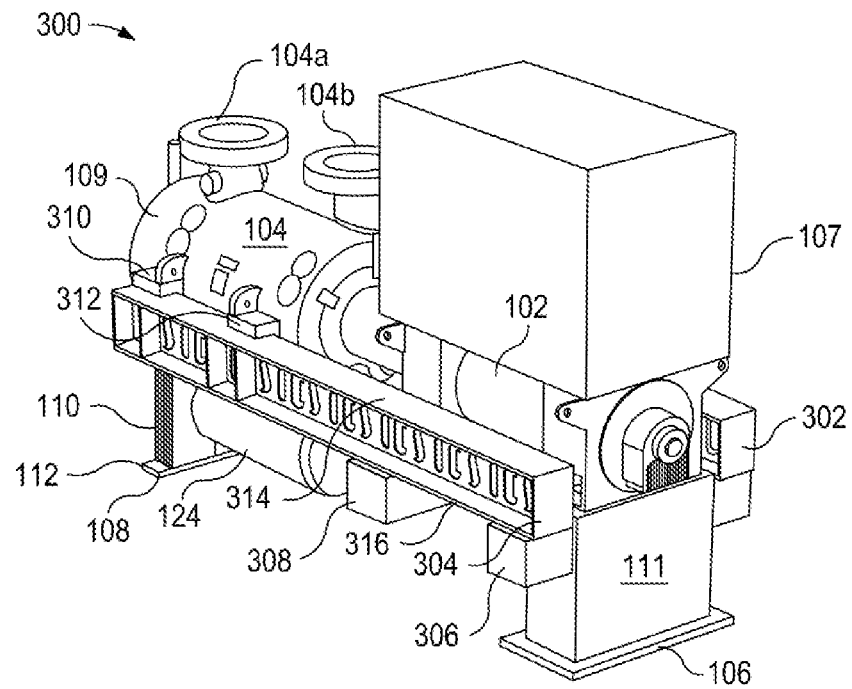
FIG. 5 illustrates a raised perspective view of yet another exemplary compression system, according to an aspect of the disclosure.
Figure 6:
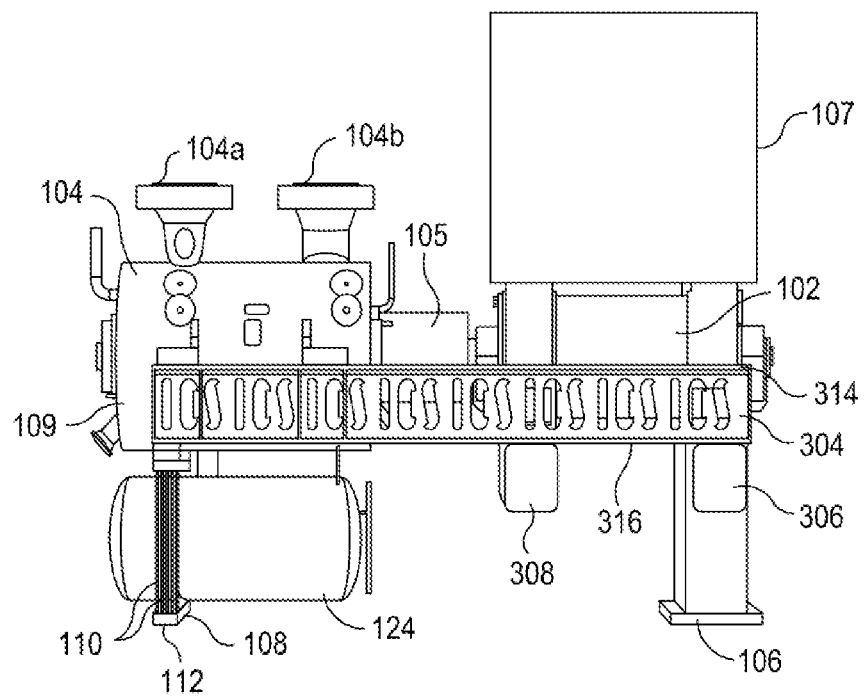
FIG. 6 illustrates an elevation view of the compression system of FIG. 5, according to an aspect of the disclosure.

FIGS. 5 and 6 illustrate a raised perspective view and a side elevation view, respectively, of yet another exemplary compression system 300, according to an embodiment described. The compression system 300 may be similar in structure and function to the compression systems 100, 200 described above; therefore, like numerals are used to refer to like elements in the Figures and will not be described in duplicate herein.

The compression system 300 includes a pair of beams 302, 304, which serve as the subframe connector. The beams 302, 304, which may be I-beams, extend between the motor support 106 and the compressor support 108 and provide a rigid connection between the motor 102 and the compressor 104. On the motor 102 side, the beams 302, 304 may be coupled, e.g., welded or fastened, to the motor support 106 and/or to the motor casing 107 via one or more cross-members (two shown: 306, 308). The cross-members 306, 308 may extend perpendicular to the beams 302, 304 and may connect the beams 302, 304 together to provide additional (e.g., lateral) stiffness. In other exemplary embodiments, the cross-members 306, 308 may each be two or more blocks, connecting the beams 302, 304 to the motor casing 107, but may not extend to provide a linkage directly between the two beams 302, 304. Additionally, the cross-members 306, 308 may extend at non-square angles to the beams 302, 304 to provide a truss for additional rigidity.

On the compressor 104 side, the beams 302, 304 may be coupled, e.g., welded or fastened, to the compressor casing 109 via one or more protrusions (two shown: 310, 312) and/or may be coupled directly to the flex-plates 110. Although not viewable, additional protrusions may be coupled to the beam 302 analogously to those shown for the beam 304. The protrusions 310, 312 may be disposed at the vertical center of the compressor 104 and may extend horizontally outward therefrom. The protrusions 310, 312 may be coupled to the beam 304 using any suitable device or method, such as by welding, fastening, brazing, or being integrally formed therewith. Further, the protrusions 310, 312 may engage a top 314 of the beam 302, a bottom 316 of the beam 302, or any other suitable portion of the beam 302. Additionally, in some exemplary embodiments, the rigidity of the connection between the motor 102 and the compressor 104 may be supplemented by an elongated gas-break vessel 202, as shown in FIGS. 3 and 4, and/or a cylindrical sleeve 114, as shown in FIGS. 1 and 2.

Figure 7:
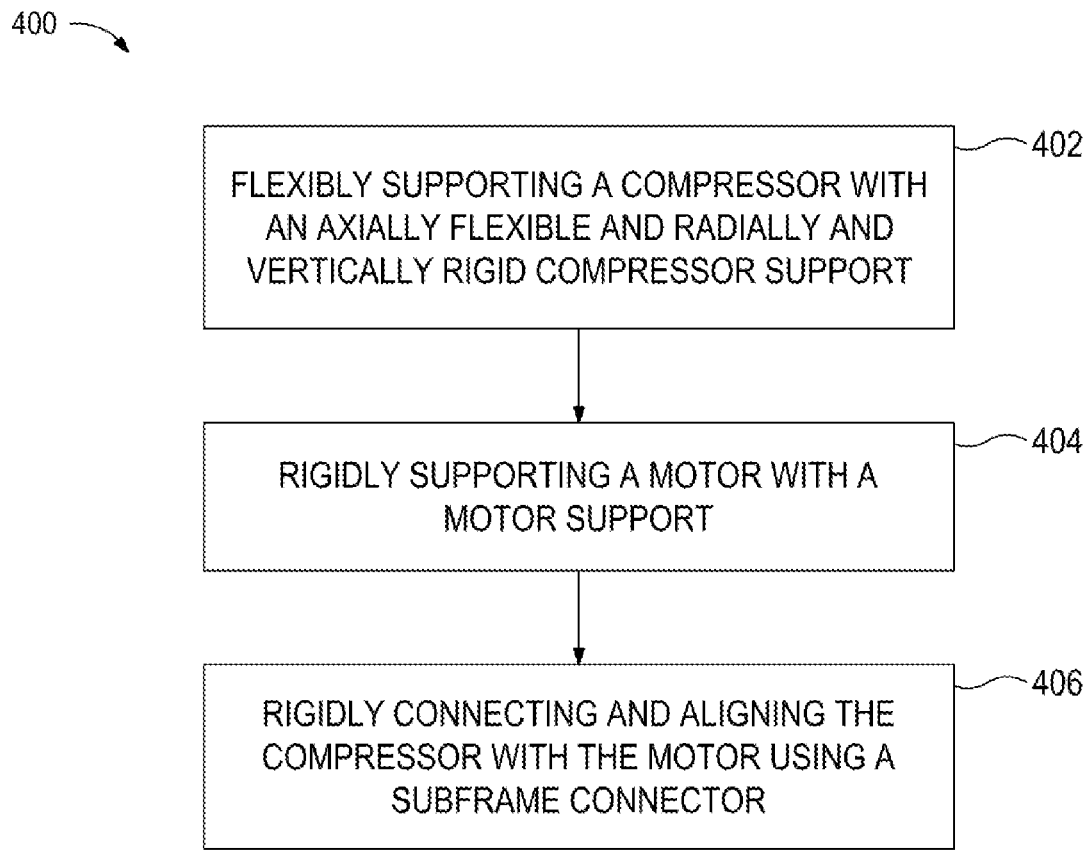
FIG. 7 illustrates a flowchart of an exemplary method for supporting a compression system, according to an aspect of the disclosure.

FIG. 7 illustrates a flowchart of an exemplary method 400 for supporting a compression system without a baseplate. The method 400 may proceed by operation of any of the compression systems 100, 200, 300 discussed above and may thus be best understood with reference thereto. The method 400 may include flexibly supporting a compressor with a compressor support, as at 402. In at least one exemplary embodiment, the compressor support may be axially flexible and radially and vertically rigid. The method 400 may also include rigidly supporting a motor with a motor support, as at 404. In an exemplary embodiment, the motor includes a shaft coupled with the compressor to drive the compressor, with the motor and the compressor being stand-alone units.

The method 400 may also include rigidly connecting and aligning the compressor with the motor with a subframe connector, as at 406. Rigidly connecting the compressor and the motor at 406 may include connecting a cylindrical sleeve to an axial end of the compressor and to an axial end of the motor such that the sleeve extends around and parallel to the shaft. Additionally or alternatively, rigidly connecting the compressor to the motor at 406 may include connecting the compressor support to a gas-break vessel fluidly coupled to a separator fluidly coupled to the compressor such that at least a portion of the compressor support and the gas-break vessel are fixed in position relative to one another. Further, the method 400 may include connecting the gas-break vessel to the motor support such that the motor support and the gas-break vessel are fixed in position relative to one another. Additionally or alternatively, rigidly connecting the compressor to the motor at 406 may include connecting a beam to the compressor via one or more center-line projections of the compressor, and connecting the beam to the motor.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A compression system, comprising:
   a compressor including a compressor support configured to support the compressor;
   a stand-alone motor having a shaft coupled with the compressor to transfer energy thereto and a motor support configured to support the motor; and
   a subframe connector rigidly coupled to the motor and to the compressor, the subframe connector being configured to maintain axial and radial alignment of the shaft between the compressor and the motor,
   wherein the subframe connector includes a gas-break vessel coupled to the compressor support and the motor support, the gas-break vessel being configured to prohibit relative movement between the gas-break vessel, the motor support, and the compressor support.

2. The compression system of claim 1, wherein:
   the compressor support includes a plurality of flex-plates and a rigid support; and
   the motor support includes a rigid pedestal and a rigid support.

3. The compression system of claim 2, wherein the gas-break vessel is fluidly coupled with the compressor and is not coupled with the plurality of flex-plates of the compressor support.

4. The compression system of claim 2, wherein the gas-break vessel is coupled to the rigid support and the rigid pedestal of the motor support and further coupled to the rigid support of the compressor support, the gas-break vessel being configured to prevent relative movement between the gas-break vessel and the respective rigid supports of the compressor support and the motor support.

5. The compression system of claim 4, wherein the gas-break vessel is not coupled with the plurality of flex-plates and extends from a point adjacent the plurality of flex-plates through the rigid pedestal.

6. The compression system of claim 1, wherein the subframe connector includes a cylindrical sleeve disposed around and parallel to the shaft, the sleeve being coupled to an axial end of the compressor and an axial end of the motor.

7. The compression system of claim 1, wherein the subframe connector includes a beam coupled to the compressor and to the motor support of the motor.

8. The compression system of claim 7, wherein the motor support includes a rigid pedestal and a cross-member axially offset from the rigid pedestal, the beam being coupled to the rigid pedestal and the cross-member.

9. The compression system of claim 8, wherein the compressor includes a centerline protrusion extending outward and coupled to the beam.

10. An apparatus for supporting a compression system, comprising:
    a compressor support coupled to a compressor;
    a motor support coupled to a motor, the motor and the compressor being stand-alone units and having a shaft extending therebetween; and
    a subframe connector coupled to the compressor support and the motor support and configured to prevent radial and axial misalignment of the shaft,
    wherein the subframe connector includes a gas-break vessel coupled to the compressor support and the motor support, the gas-break vessel being configured to prohibit relative movement between the gas-break vessel, the motor support, and the compressor support.

11. The apparatus of claim 10, wherein the subframe connector is coupled to the compressor support via connection with an axial end of the compressor and is coupled to the motor support via connection with an axial end of the motor.

12. The apparatus of claim 11, wherein the subframe connector includes an axially-extending sleeve extending at least partially around and parallel to the shaft.

13. The apparatus of claim 10, wherein the gas-break vessel is fluidly coupled to a separator disposed upstream of and fluidly coupled to the compressor.

14. The apparatus of claim 13, wherein:
    the compressor support includes a plurality of flex-plates and a pedestal axially-offset from the plurality of flex-plates;
    the motor support includes first and second axially offset pedestals; and
    the gas-break vessel is not coupled with the plurality of flex-plates and extends through the pedestal of the compressor support and the first and second pedestals of the motor support.

15. The apparatus of claim 13, wherein the subframe connector includes a beam coupled to the motor support, extending parallel to the shaft, and coupled to the compressor via one or more centerline protrusions of the compressor.

16. The apparatus of claim 13, wherein the apparatus is free from a baseplate.

17. A method for supporting a compression system without a baseplate, comprising:
    flexibly supporting a compressor with a compressor support;
    rigidly supporting a motor with a motor support, the motor including a shaft coupled with the compressor to drive the compressor, the motor and the compressor being stand-alone units; and
    rigidly connecting the compressor to the motor with a subframe connector to prevent radial and axial misalignment of the shaft, wherein rigidly connecting the compressor to the motor comprises:
       connecting the compressor support to a gas-break vessel fluidly coupled to the compressor to prohibit relative movement between at least a portion of the compressor support and the gas-break vessel; and connecting the gas-break vessel to the motor support such that the motor support, the compressor support, and the gas-break vessel are fixed in position relative to one another.

18. The method of claim 17, wherein rigidly connecting the compressor to the motor further comprises connecting a cylindrical sleeve to an axial end of the compressor and to an axial end of the motor such that the sleeve extends around and parallel to the shaft.

19. The method of claim 17, wherein rigidly connecting the compressor to the motor further comprises:

connecting a beam to the compressor via one or more centerline protrusions of the compressor; and connecting the beam to the motor.

* * * * *